United States Patent [19]
Lindbeck

[11] Patent Number: 5,904,332
[45] Date of Patent: May 18, 1999

[54] MOUNTING ASSEMBLY FOR MOUNTING A VIBRATOR TO A PIPE

[75] Inventor: Michael J. Lindbeck, Livonia, Mich.

[73] Assignee: Martin Engineering Company, Neponset, Ill.

[21] Appl. No.: 09/017,619

[22] Filed: Feb. 2, 1998

[51] Int. Cl.$^6$ ................................................. F16M 13/00
[52] U.S. Cl. ........................ 248/560; 248/230.8; 366/114
[58] Field of Search .................... 248/560, 674, 248/682, 689, 230.8, 218.4; 326/108, 109, 114, 127

[56] References Cited

U.S. PATENT DOCUMENTS

| | | | |
|---|---|---|---|
| 1,825,117 | 9/1931 | Hudson | 248/674 |
| 1,858,855 | 5/1932 | Haas | 366/114 |
| 1,868,169 | 7/1932 | Jackson | 366/114 |
| 4,551,041 | 11/1985 | Coon et al. | 406/85 |
| 4,554,941 | 11/1985 | Coon et al. | 137/240 |
| 4,657,283 | 4/1987 | White | 285/18 |
| 4,844,396 | 7/1989 | Norton | 248/230.8 |
| 5,172,881 | 12/1992 | Stein | 248/230.8 |

Primary Examiner—Ramon O. Ramirez
Assistant Examiner—Robert Lipcsik
Attorney, Agent, or Firm—Lee, Mann, Smith, McWilliams, Sweeney & Ohlson

[57] ABSTRACT

A mounting assembly for mounting a vibrator to the outer surface of a pipe. The mounting assembly includes a mounting base having a top surface adapted to receive the vibrator and a bottom surface including a groove having two opposing inclined side walls that are adapted to be placed in engagement with the outer surface of the pipe. A tensioner having a selectively extendable and retractable end is attached to the top surface of the mounting base. An elongate flexible strap adapted to be wrapped around the pipe includes a first end attached to the moveable end of the tensioner and a second end that is adapted to be selectively attached to the moveable end of the tensioner after the strap is wrapped around the pipe. The moveable end of the tensioner is extended to tension the strap about the pipe and to thereby tightly mount the mounting base to the outer surface of the pipe such that the mounting base transmits vibrations from the vibrator to the pipe to dislodge any material forming a blockage in the pipe.

15 Claims, 1 Drawing Sheet

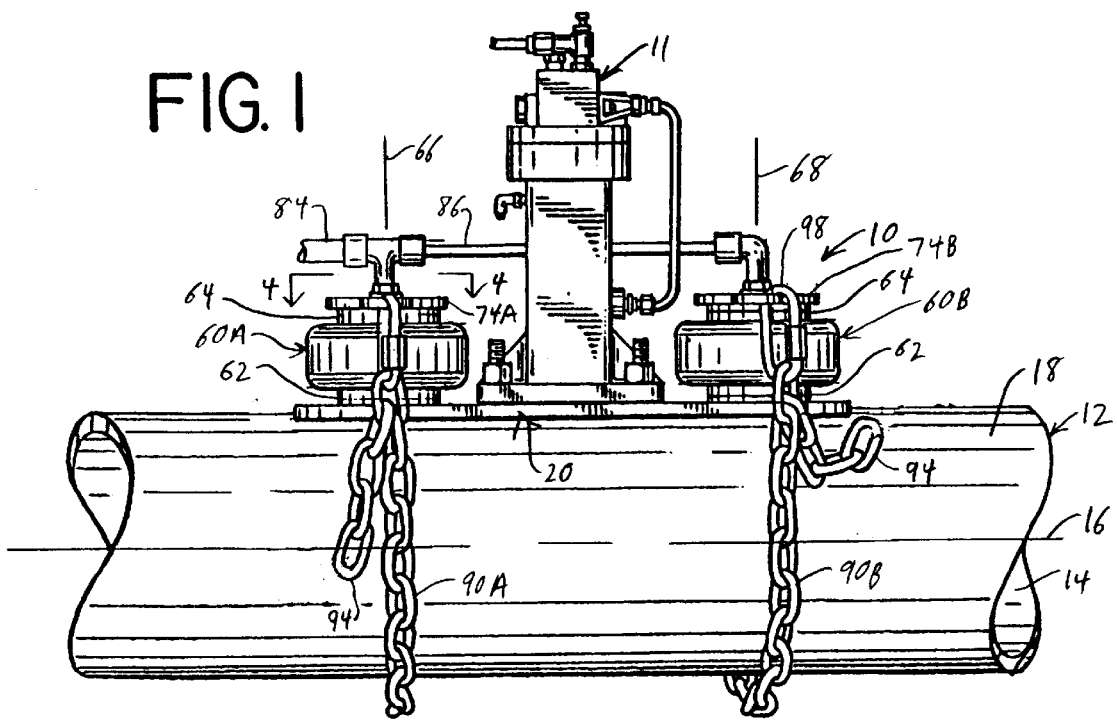
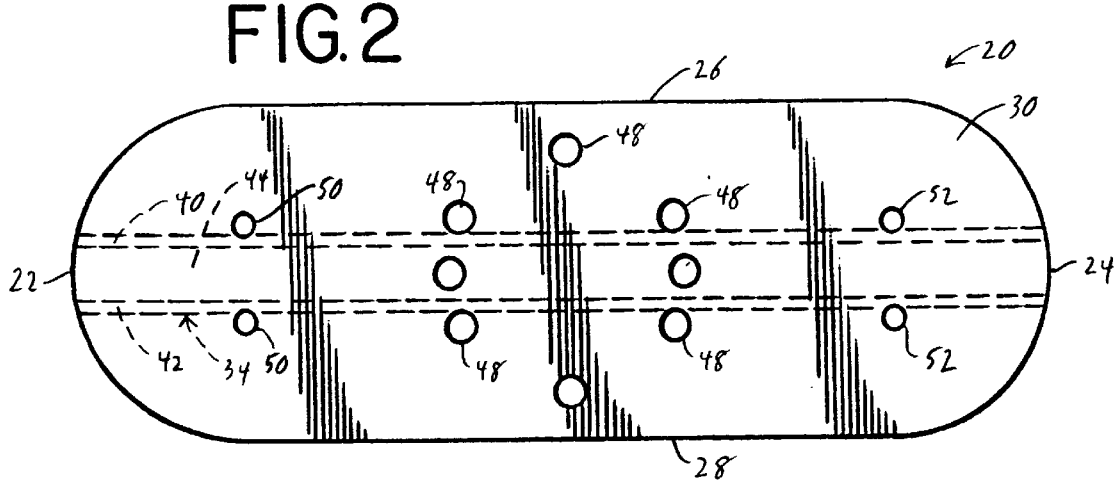
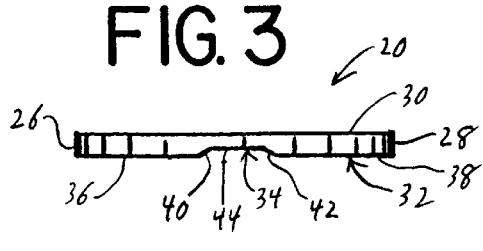
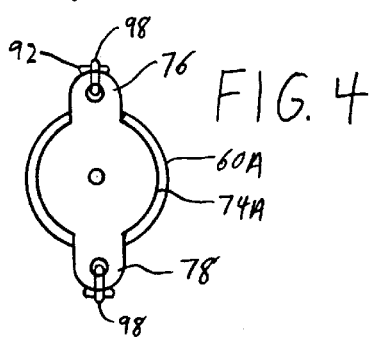

5,904,332

MOUNTING ASSEMBLY FOR MOUNTING A VIBRATOR TO A PIPE

BACKGROUND OF THE INVENTION

The present invention is directed to a mounting assembly for mounting a vibrator to the outer surface of a tubular conduit such as a pipe, and in particular to a mounting assembly having a mounting base with a groove that is adapted to engage the conduit and a tensioner connected to the mounting base that is adapted to tension a strap around the conduit.

In the manufacturing industry many types of the materials are transported through tubular conduits such as pipes. The transported material may be a liquid, a slurry, or dry solids. The transported material often becomes lodged within the pipe creating a build-up of the transported material that reduces or stops the flow of material through the pipe. Workers commonly pound on pipes with a hammer to loosen the blocking material within the pipe so that it may flow through the pipe. In addition, vibrators have previously been attached by clamps to mounts that are bolted to pipes such that the vibrator can vibrate the pipe to dislodge built-up material.

SUMMARY OF THE INVENTION

A mounting assembly for mounting a vibrator to the outer surface of a conduit such as a tubular pipe. The mounting assembly includes a generally planar mounting base having a top surface and a spaced apart bottom surface. The top surface is adapted to receive the vibrator. The bottom surface of the mounting base includes an elongate groove extending between a first end of the mounting base and a second end of the mounting base. The groove includes a first wall and a spaced apart and opposing second wall. The first wall and the second wall are disposed at an angle relative to one another in a generally V-shaped configuration. The first wall and the second wall of the groove are adapted to engage the outer surface of the conduit. A tensioner such as a fluid operated cylinder has a first end attached to the top surface of the mounting base and a second end that is selectively extendable and retractable with respect to the first end of the tensioner between a retracted first position, wherein the second end of the tensioner is located a first distance from the first end of the tensioner, and an extended second position wherein the second end of the tensioner is located a second distance from the first end of the tensioner, wherein the second distance is longer than the first distance. A mounting bracket is attached to the second end of the tensioner. An elongate flexible strap such as a chain that is adapted to be wrapped around the conduit includes a first portion that is attached to the mounting bracket, and thereby to the second end of the tensioner, and a second portion that is adapted to be selectively attached to the mounting bracket and thereby to the second end of the tensioner.

The first and second walls of the groove in the bottom surface of the mounting base are placed in engagement with the outer surface of the conduit. The first portion of the strap is attached to the mounting bracket. The strap is wrapped around the conduit and the second portion of the strap is attached to the mounting bracket. The tensioner is then actuated such that the second end of the tensioner is extended from the retracted first position to the extended second position, thereby tensioning the strap and tightly mounting the mounting base to the outer surface of the conduit such that the mounting base is adapted to transmit vibrations from the vibrator to the conduit. The mounting assembly and vibrator may be removed from the conduit by actuating the tensioner and retracting the second end of the tensioner from the extended second position to the retracted first position thereby loosening the strap such that the second portion of the strap may be removed from the mounting bracket.

BRIEF DESCRIPTION OF THE DRAWING FIGURES

FIG. 1 is a front elevational view showing the mounting assembly of the present invention mounting a vibrator to a pipe.

FIG. 2 is a top plan view of the mounting base of the mounting assembly.

FIG. 3 is an end view of the mounting base.

FIG. 4 is a top plan view of the mounting bracket attached to the second end of the tensioner taken along lines 4—4 of FIG. 1.

DETAILED DESCRIPTION OF THE PREFERRED EMBODIMENT

The mounting assembly 10 of the present invention is adapted to removably mount a vibrator 11 to an object to be vibrated. The object to be vibrated may be a conduit, such as a tubular pipe 12, as shown in FIG. 1. The vibrator 11 may be of any type of commonly available vibrator, such as sold by Martin Engineering Company. The pipe 12 includes a bore 14 having a longitudinal central axis 16. The pipe 12 also includes a generally cylindrical outer surface 18 that extends in a generally circular manner concentrically about the central axis 16. Various types of materials such as liquids, slurries, or dry solids are transportable through the bore 14.

The mounting assembly 10 includes a mounting base 20 as best shown in FIGS. 2 and 3. The mounting base 20 is an elongate generally planar plate member that extends longitudinally between a first end 22 and a second end 24. The mounting base 20 extends transversely between a first side edge 26 and a second side edge 28. The mounting base 20 includes a generally planar top surface 30 and a bottom surface 32 that is spaced apart from and generally coextensive with the top surface 30. The bottom surface 32 includes a linear elongate groove 34 that is located generally centrally between the first side edge 26 and the second side edge 28 of the mounting base 20 and that extends from the first end 22 to the second end 24 of the mounting base 20. The groove 34 forms an open channel. The bottom surface 32 also includes a first generally planar portion 36 that extends between one side of the groove 34 and the first side edge 26, and a second generally planar portion 38 that extends between the opposite side of the groove 34 and the second side edge 28 of the mounting base 20. The first and second planar portions 36 and 38 of the bottom surface 32 are generally coplanar with one another and generally parallel to the top surface 30.

The groove 34 includes a first generally planar inclined side wall 40 and a spaced apart and opposing second generally planar inclined side wall 42. The groove 34 also includes a generally planar top wall 44 that extends between the first side wall 40 and the second side wall 42 generally parallel to the top surface 30 and the planar portions 36 and 38 of the bottom surface 32. As shown in FIG. 3, the side walls 40 and 42 of the groove 34 are disposed in a generally V-shaped configuration at an angle relative to one another. The first and second side walls 40 and 42 are disposed at an angle of 120° relative to one another as shown in FIG. 3, but may be disposed at other angles depending upon the size of the outer diameter of the pipe 12. The first side wall 40 extends from the first planar portion 36 to the top wall 44 in a direction toward the second side wall 42. The second side wall 42 extends from the second planar portion 38 to the top wall 44 in a direction toward the first side wall 40. The first and second side walls 40 and 42 extend from the first end 22 of the mounting base 20 to the second end 24 of the mounting base 20 in generally parallel directions relative to one another. The groove 34 may alternatively be formed in other configurations including curved and/or planar surfaces.

The bottom surface 32 of the mounting base 20 is adapted to be placed into engagement with the outer surface 18 of the pipe 12. The channel formed by the groove 34 is adapted to receive the pipe 12 such that the first and second side walls 40 and 42 of the groove 34 tangentially engage the outer surface 18 of the pipe 12 along respective longitudinal lines of contact that are spaced apart and generally parallel to one another. The respective lines of contact between each side wall 40 and 42 and the outer surface 18 of the pipe 12 extend the length of the side walls 40 and 42. This configuration of engagement between the mounting base 20 and the pipe 12 provides for increased transmission of vibrations by the mounting base 20 from the vibrator 11 to the pipe 12.

As shown in FIG. 2, the mounting base 20 includes a plurality of apertures 48 that are adapted to mount the vibrator 11 to the top surface 30 of the mounting base 20 with the use of fasteners such as nuts and bolts. The apertures 48 are preferably countersunk at the bottom surface 32 such that the heads of the fasteners do not project beyond the bottom surface 32 of the mounting base 20. The mounting apertures 48 are generally centrally located on the mounting base 20 between the ends 22 and 24. The mounting base 20 also includes a pair of mounting apertures 50 located between the mounting apertures 48 and the first end 22 of the mounting base 20 and a pair of mounting apertures 52 located between the mounting apertures 48 and the second end 24 of the mounting base 20. The mounting apertures 50 and 52 are also preferably countersunk at the bottom surface 32.

The mounting assembly 10 as shown in FIG. 1 includes a tensioner 60A and a tensioner 60B. The tensioners 60A and B are respectively located on opposite sides of the vibrator 11. The tensioner 60A is mounted to the top surface 30 of the mounting base 20 by fasteners (not shown) that extend through the mounting apertures 50. The tensioner 60B is similarly mounted to the top surface 30 of the mounting base 20 by fasteners (not shown) that extend through the mounting apertures 52. The tensioners 60A and B are identical to one another in structure and operation. The tensioners 60A and B each include a first end 62 that is mounted to the top surface 30 of the mounting base 20 and a second end 64. The second end 64 of the tensioner 60A is selectively extendable and retractable with respect to its first end 62 along a linear longitudinal axis 66 between a retracted first position and an extended second position. The second end 64 of the tensioner 60B is also selectively extendable and retractable with respect to its first end 62 along a linear longitudinal axis 68 between a retracted first position and an extended second position. The axes 66 and 68 are preferably generally parallel to one another. The axes 66 and 68 preferably intersect the central axis 16 of the pipe 12 and are preferably generally perpendicular thereto. When the second end 64 of a tensioner 60A or B is in the retracted first position, the second end 64 is located at a first distance from the first end 62 of the tensioner, and when the second end 64 is located in the extended second position, the second end 64 is located at a second distance from the first end 62 of the tensioner. The second distance is longer than the first distance. The tensioners 60A and B may be fluid operated cylinders, such as pneumatic cylinders or hydraulic cylinders, or other jacking devices. One type of preferred pneumatic cylinder is a pneumatic spring or air bag as shown in FIG. 1 having a flexible side wall that permits the extension and retraction of the second end 64.

The mounting assembly 10 includes a mounting bracket 74A that is attached to the second end 64 of the tensioner 60A and a mounting bracket 74B that is attached to the second end 64 of the tensioner 60B. The mounting brackets 74A and B are identical to one another. The mounting brackets 74A and B are generally planar plates. As best shown in FIG. 4, the mounting brackets 74A and B each include a first lug 76 and a second lug 78. The lugs 76 and 78 are located on diametrically opposite sides of the mounting brackets 74A and B. Each lug 76 and 78 includes a respective aperture. The mounting brackets 74A and B move conjointly with their respective second ends 64 of the tensioners 60A and B to which they are attached.

A fluid supply conduit 84 is attached in operative fluid communication with the tensioner 60A. A fluid supply conduit 86 is attached in operative fluid communication with the tensioner 60B and the conduit 84, and provides fluid communication between the fluid supply conduit 84 and the tensioner 60B. As shown in FIG. 1, the tensioners 60A and B are thereby linked in series with one another to the fluid supply conduit 84. A fluid, such as a liquid or a gas, is selectively supplied to the tensioners 60A and B under a desired pressure to conjointly extend the second ends 64 of the tensioners 60A and B from their retracted first positions to their extended second positions. The pressure of the fluid supplied to the tensioners 60A and B can be selectively decreased, or the fluid may be withdrawn from the tensioners 60A and B, to selectively and conjointly retract the second ends 64 of the tensioners 60A and B from their extended second position to their retracted first position. As the tensioners 60A and B are linked in series to one another, they will operate conjointly with one another.

The mounting assembly 10 also includes one or more elongate flexible members, such as a strap 90A and a strap 90B. Each strap 90A and B is flexible and elongate and includes a first end 92 and a second end 94. The term "strap" as used herein includes elongate flexible members such as chains having a plurality of links, as shown in FIG. 1, as well as cable, rope, webbing and other such members that are used for binding two objects together. A respective connecting link 98 is attached to each lug 76 and 78 of the mounting brackets 74A and B. Each connecting link 98 includes a moveable sleeve that selectively provides a gap in the link 98 enabling the link 98 to be inserted through the apertures in the lug 76 or 78 of the mounting brackets 74A and B. The connecting links 98 are also adapted to allow the straps 90A and B to be selectively connected to the connecting links 98 and thereby to the mounting brackets 74A and B and the second ends 64 of the tensioners 60A and B.

The mounting assembly 10, as shown in FIG. 1, includes two tensioners (60A and B), two mounting brackets (74A and B), and two straps (90A and B). However, the mounting assembly 10 may include only one tensioner, one mounting bracket and one strap, if desired.

In operation, the vibrator 11 is mounted to the top surface 30 of the mounting base 20. The bottom surface 32 of the mounting base 20 is then placed into engagement with the outer surface 18 of the pipe 12. The pipe 12 is located within the channel formed by the groove 34 of the bottom surface 32 such that the first and second side walls 40 and 42 of the groove 34 engage the outer surface 18 of the pipe 12. A first portion of the strap 90A, preferably the first end 92, is attached to the first lug 76 of the mounting bracket 74A and thereby to the second end 64 of the tensioner 60A. With the tensioner 60A in the retracted first position, the strap 90A is wrapped around the pipe 12 and a second portion of the strap 90A that is spaced apart from the first portion is removably attached to the second lug 78 of the mounting bracket 74A and thereby to the second end 64 of the tensioner 60A. The strap 90A is wrapped around the pipe 12 in a generally U-shaped or C-shaped configuration. The second portion of the strap 90A that is attached to the second lug 78 may be located anywhere along the length of the strap 90A depending upon the diameter of the pipe 12. However, the second portion of the strap 90A that is attached to the second lug 78 of the mounting bracket 74A should preferably be located on the strap 90A such that the strap 90A is as tightly wrapped around the pipe 12 as possible. The strap 90B is then wrapped around the pipe 12 and connected to the mounting bracket 74B in a similar manner.

The tensioners 60A and B are then actuated through the fluid supply conduit 84 to conjointly extend the second ends 64 of the tensioners 60A and B from their respective retracted first positions to their extended second positions. As the second ends 64 of the tensioners 60A and B move toward their extended second positions, the tensioners 60A and B respectively tension the straps 90A and B tightly around the pipe 12 and thereby tightly mount the mounting base 20 to the outer surface 18 of the pipe 12. The mounting base 20 is now adapted to effectively transmit vibrations from the vibrator 11 to the pipe 12 to dislodge any material in the bore 16 of the pipe 12 that may be causing a blockage.

The mounting assembly 10 and vibrator 11 can be removed from the pipe 12 by actuating the tensioners 60A and B to retract the respective second ends 64 from their extended second positions to their retracted first positions, thereby loosening the straps 90A and B. Once the straps 90A and B have been loosened, the second portion of each strap 90A and B is disconnected from the second lug 78 of the mounting brackets 74A and B. The mounting assembly 10 and vibrator 11 may then be removed from the pipe 12.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A mounting assembly for mounting a vibrator to the outer surface of an object to be vibrated, said mounting assembly including:

a mounting base having a top surface and a spaced apart bottom surface, said top surface adapted to be placed in engagement with the vibrator, said bottom surface adapted to be placed in engagement with the outer surface of the object to be vibrated;

a tensioner having a first end and a second end, said first end of said tensioner being attached to said mounting base, said second end of said tensioner being selectively extendable from a first position, wherein said second end of said tensioner is located a first distance from said first end of said tensioner, to a second position wherein said second end of said tensioner is located a second distance from said first end of said tensioner, said second distance being longer than said first distance; and an elongate flexible member adapted to extend at least partially around the object to be vibrated, said flexible member having a first portion and a spaced apart second portion, said first portion of said flexible member being attached to said second end of said tensioner, said second portion of said flexible member adapted to be selectively attached to said second end of said tensioner;

whereby, when said flexible member is extended at least partially around the object to be vibrated and said first and second portions of said flexible member are attached to said second end of said tensioner, said tensioner is selectively actuated to move said second end of said tensioner from said first position to said second position thereby tensioning said flexible member around the object to be vibrated and tightly mounting said mounting base to the outer surface of the object to be vibrated such that said mounting base is adapted to transmit vibrations from the vibrator to the object to be vibrated.

2. The mounting assembly of claim 1 wherein said bottom surface of said mounting base includes an elongate groove extending from a first end of said mounting base to an opposing second end of said mounting base, said groove adapted to engage the outer surface of the object to be vibrated.

3. The mounting assembly of claim 2 wherein said groove includes a first side wall and a spaced apart and opposing second side wall, each said side wall adapted to engage the outer surface of the object to be vibrated.

4. The mounting assembly of claim 3 wherein said first and second side walls are disposed at an angle relative to one another.

5. The mounting assembly of claim 3 wherein said groove includes a top wall extending between said first and second side walls.

6. The mounting assembly of claim 1 wherein said mounting base comprises a generally planar plate.

7. The mounting assembly of claim 1 wherein said elongate flexible member comprises a chain.

8. The mounting assembly of claim 1 wherein said tensioner comprises a fluid operated cylinder.

9. The mounting assembly of claim 1 wherein said tensioner comprises an air bag.

10. A mounting assembly for mounting a vibrator to the outer surface of an object to be vibrated, said mounting assembly including:

a mounting base adapted to be placed in engagement with the outer surface of the object to be vibrated;

a tensioner having a first end and a second end, said first end of said tensioner attached to said mounting base, said second end of said tensioner being selectively movable between a first position, wherein said second end of said tensioner is located a first distance from said first end of said tensioner, and a second position wherein said second end of said tensioner is located a second distance from said first end of said tensioner;

a bracket attached to said second end of said tensioner;

an elongate flexible member adapted to extend at least partially around the object to be vibrated, said flexible member having a first portion and a spaced apart second portion, said first portion of said flexible member attached to said bracket, said second portion of said flexible member adapted to be selectively attached to said bracket;

whereby, when said flexible member is extended at least partially around the object to be vibrated and said first and second portions of said flexible member are attached to said bracket, said second end of said tensioner is moved from said first position to said second position thereby tensioning said flexible member and tightly mounting said mounting base to the outer surface of the object to be vibrated such that said mounting base is adapted to transmit vibrations from the vibrator to the object to be vibrated.

11. The mounting assembly of claim 10 wherein said mounting base includes an elongate groove extending from a first end of said mounting base to an opposing second end of said mounting base, said groove adapted to engage the outer surface of the object to be vibrated.

12. The mounting assembly of claim 11 wherein said groove includes a first side wall and a spaced apart and opposing second side wall, each said side wall adapted to engage the outer surface of the object to be vibrated.

13. The mounting assembly of claim 10 wherein said mounting base comprises a generally planar plate.

14. The mounting assembly of claim 10 wherein said flexible member comprises a chain.

15. The mounting assembly of claim 10 wherein said tensioner comprises a fluid operated cylinder.

* * * * *